US012685991B2

(12) United States Patent
Penzo et al.

(10) Patent No.: US 12,685,991 B2
(45) Date of Patent: Jul. 21, 2026

(54) REACTOR FOR A GAS-PHASE OLEFIN POLYMERIZATION

(71) Applicant: Basell Polyolefine GmbH, Wesseling (DE)

(72) Inventors: Giuseppe Penzo, Mantova (IT); Maurizio Dorini, Ferrara (IT); Riccardo Rinaldi, Ferrara (IT); Enrico Balestra, Ferrara (IT); Gian Luca Bonaccorsi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 571 days.

(21) Appl. No.: 18/256,065

(22) PCT Filed: Dec. 7, 2021

(86) PCT No.: PCT/EP2021/084630
§ 371 (c)(1),
(2) Date: Jun. 6, 2023

(87) PCT Pub. No.: WO2022/122749
PCT Pub. Date: Jun. 16, 2022

(65) Prior Publication Data
US 2024/0075450 A1 Mar. 7, 2024

(30) Foreign Application Priority Data

Dec. 9, 2020 (EP) .................................... 20212671

(51) Int. Cl.
*B01J 19/24* (2006.01)
*B01J 4/00* (2006.01)
(Continued)

(52) U.S. Cl.
CPC .......... *B01J 19/2435* (2013.01); *B01J 4/001* (2013.01); *B01J 8/1854* (2013.01);
(Continued)

(58) Field of Classification Search
None
See application file for complete search history.

(56) References Cited

U.S. PATENT DOCUMENTS 4,419,965 A 12/1983 Garcia-Mallol et al.
5,753,191 A 5/1998 Yamamoto et al.
(Continued)

FOREIGN PATENT DOCUMENTS

DE 1887282 U 2/1964
EP 0513816 A2 11/1992
(Continued)

*Primary Examiner* — Fred M Teskin

(57) ABSTRACT

A reactor for carrying out a gas-phase olefin polymerization in the presence of a polymerization catalyst, made from or containing (i) a first polymerization zone adapted and arranged for growing polymer particles to flow upward under fast fluidization or transport conditions, (ii) a second polymerization zone adapted and arranged for the growing polymer particles to flow downward, and (iii) a set of bars for introducing feedstock or a barrier stream into the reactor, wherein each bar has (a) a hollow space along the length of the bar, (b) a particle deviating top, and (c) a multiplicity of openings arranged along the bottom half of the periphery of the bar.

19 Claims, 4 Drawing Sheets

(51) Int. Cl.
  *B01J 8/18*          (2006.01)
  *C08F 2/34*          (2006.01)
(52) U.S. Cl.
  CPC ...... *B01J 19/2405* (2013.01); *B01J 2204/002*
        (2013.01); *B01J 2208/00991* (2013.01); *B01J*
                            *2219/185* (2013.01)

(56)                References Cited

U.S. PATENT DOCUMENTS

| | | | |
|---|---|---|---|
| 11,098,143 | B2 | 8/2021 | Mazzucco et al. |
| 2020/0368707 | A1 | 11/2020 | Zhao et al. |

FOREIGN PATENT DOCUMENTS

| | | | |
|---|---|---|---|
| EP | 1012195 | B1 | 2/2003 |
| EP | 0856530 | B1 | 5/2003 |
| EP | 2613873 | A1 | 7/2013 |
| EP | 2745925 | A1 | 6/2014 |
| JP | H05005001 | A | 1/1993 |
| JP | 2004298769 | A | 10/2004 |
| JP | 2015532347 | A | 11/2015 |
| JP | 2017522414 | A | 8/2017 |
| JP | 2020533477 | A | 11/2020 |
| KR | 20180032936 | A | 4/2018 |
| WO | 9704015 | A1 | 2/1997 |
| WO | 0002929 | A1 | 1/2000 |
| WO | 0238629 | A2 | 5/2002 |
| WO | 2009080660 | A1 | 7/2009 |
| WO | 2011090131 | A1 | 7/2011 |
| WO | 2012031986 | A1 | 3/2012 |
| WO | 2016020482 | A1 | 2/2016 |
| WO | 2018087209 | A1 | 5/2018 |

REACTOR FOR A GAS-PHASE OLEFIN POLYMERIZATION

This application is the U.S. National Phase of PCT International Application PCT/EP2021/084630, filed Dec. 7, 2021, claiming benefit of priority to European Patent Application No. 20212671.0, filed Dec. 9, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a reactor for carrying out a gas-phase olefin polymerization in the presence of a polymerization catalyst and a process related thereto.

BACKGROUND OF THE INVENTION

In some instances, gas-phase polymerization is used for gaseous monomers such as ethylene and propylene. In some instances and to control the molecular weight distribution of the polymer, gas-phase polymerization is carried out in different polymerization zones, that is, with multizone polymerization reactors.

In some instances, a gas-phase polymerization reactor, having three or more polymerization zones, is operated with different ratios of hydrogen to the sum of olefins in the reaction gas mixture within the polymerization zones, thereby yielding polyolefins of varying compositions.

In some instances and independent of the number of polymerization zones, the technique of the multizone reactor relies on the different compositions of the gas mixtures present in the different polymerization zones and the separation of those mixtures.

SUMMARY OF THE INVENTION

In a general embodiment, the present disclosure provides a reactor for carrying out a gas-phase olefin polymerization in the presence of a polymerization catalyst, including (i) a first polymerization zone adapted and arranged for growing polymer particles to flow upward under fast fluidization or transport conditions, (ii) a second polymerization zone adapted and arranged for the growing polymer particles to flow downward, and (iii) a set of bars for introducing feedstock or a barrier stream into the second polymerization zone, wherein each bar has (a) a hollow space along the length of the bar for conveying the feedstock or barrier stream within the bar, (b) a particle deviating top for preventing accumulation of the polymer particles on the bars, and (c) a multiplicity of openings for distributing the feedstock or the barrier stream, wherein the openings being arranged along the bottom half of the periphery of the bar.

In some embodiments, the particle deviating top of the bar includes a top edge which extends along the length of the bar.

In some embodiments, the bottom half of the periphery of the bar has a particle deviating shape including a bottom edge which extends along the length of the bar.

In some embodiments, each bar includes (d) a distributing part for distributing the feedstock or the barrier stream and (e) a deviating part which forms the particle deviating top of the bars. In some embodiments, the distributing part is in the shape of a pipe.

In some embodiments, the distributing part is a pipe having a diameter of 25 mm to 100 mm.

In some embodiments, the hollow space of the bar has a center axis, which runs along the length of the bar, and the openings are arranged within the part of the bottom half of the periphery of the bar, thereby forming an angle between a vertical plane through the center axis of the bar and a plane passing through an opening and the center axis of from 0° to 70°, alternatively from 20° to 50°.

In some embodiments, the openings have a diameter of 0.5 mm to 10 mm, alternatively 1.5 mm to 5 mm.

In some embodiments, the particle deviating top of the bar has a first planar surface and a second planar surface, wherein the intersection of the first planar surface and the second planar surface forms the top edge, thereby form a dihedral angle between the surfaces of less than 120°, alternatively from 10° to 100°, alternatively from 30° to 80°.

In some embodiments, the bars are arranged to extend across a first part of the width of the second polymerization zone from a first side and across a second part of the width of the second polymerization zone from the side opposite the first side, thereby leaving a gap between the opposing bars.

In some embodiments, the reactor further includes a set of supports for supporting the bars. In some embodiments, the set is for supporting the bars for introducing a barrier stream.

In some embodiments, an end of the bars or the supports is adapted to be form-fittingly connected to the wall of the second polymerization zone.

In some embodiments, the bars or the supports have a surface roughness Ra of no more than 5 μm, alternatively ranging from 0.1 μm to 5 μm, alternatively ranging from 0.5 μm to 4 μm, determined according to DIN ISO 25178.

In a general embodiment, the present disclosure provides a bar for introducing feedstock or a barrier stream into a multizone circulating reactor (MZCR), having (a) a hollow space along the length of the bar for conveying the feedstock or the barrier stream within the bar, (b) a particle deviating top for preventing accumulation of the polymer particles on the bar, and (c) a multiplicity of openings for distributing the feedstock or the barrier stream, wherein the openings being arranged along the bottom half of the periphery of the bar.

In a general embodiment, the present disclosure provides a process for carrying out a gas-phase olefin polymerization at temperatures from 20° C. to 200° C. and pressures from 0.5 MPa to 10 MPa in the presence of a polymerization catalyst in the reactor, including the steps of (i) feeding one or more olefins into the reactor, (ii) contacting the olefins and the catalyst under reaction conditions in the first polymerization zone and the second polymerization zone, and (iii) collecting the polymer product from the second polymerization zone, wherein (A) the growing polymer particles flow upward through the first polymerization zone under fast fluidization or transport conditions, leave the first polymerization zone, enter the second polymerization zone, flow downward through the second polymerization zone under the action of gravity, leave the second polymerization zone, and are at least partially reintroduced into the first polymerization zone, thereby circulating the growing polymer particles between the first polymerization zone and the second polymerization zone, (B) the second polymerization zone has a bed of densified polymer particles, and (C) feedstock or a barrier stream is introduced into the second polymerization zone through a set of bars.

In some embodiments, the pressure difference between the pressure of the reaction gas in the second polymerization zone and the pressure of the feedstock or the barrier stream in the hollow space is from 1 to 500 kPa, alternatively from 5 to 200 kPa, alternatively from 10 to 100 kPa.

DETAILED DESCRIPTION OF THE INVENTION

Figure 1:
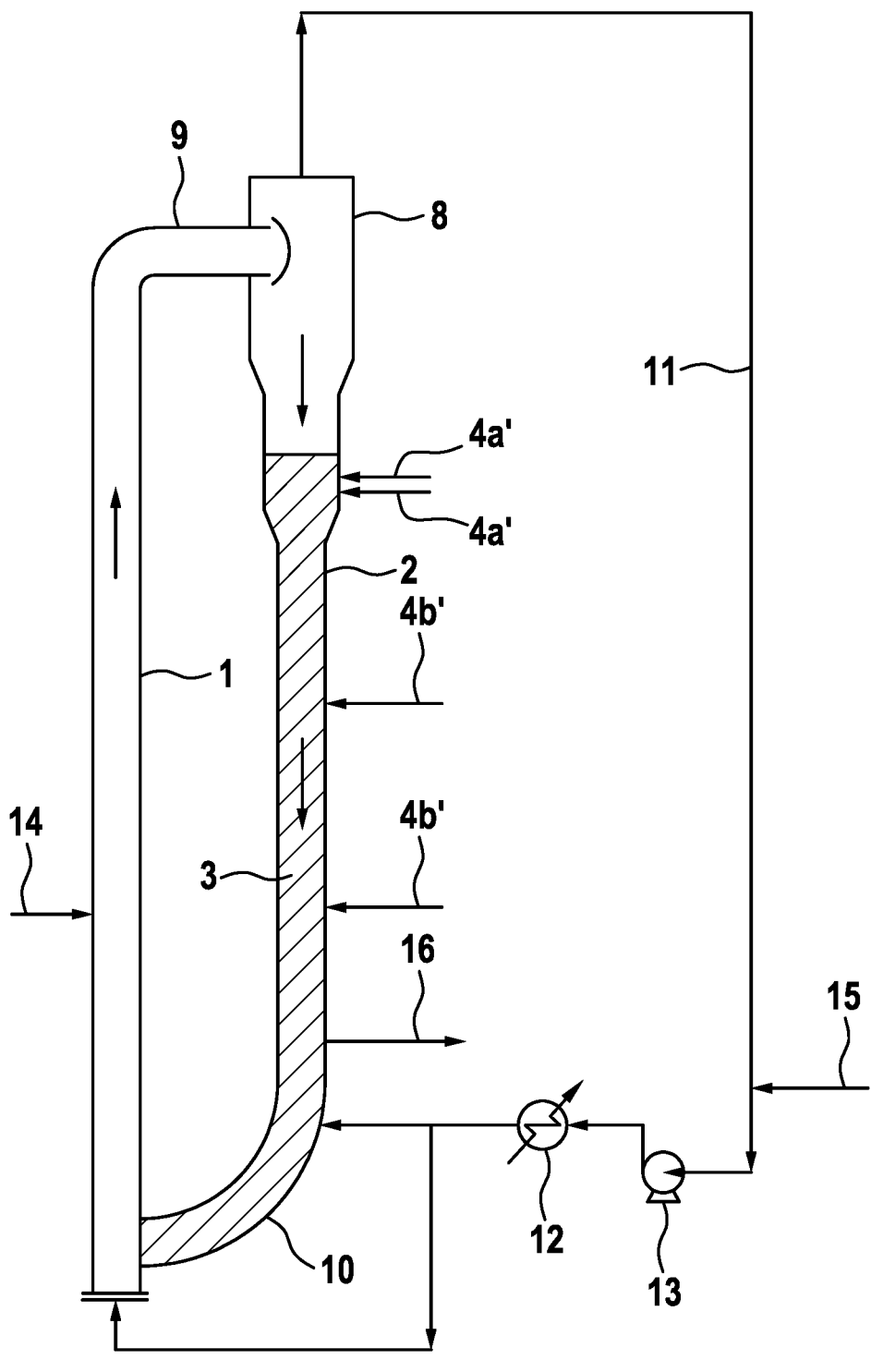
FIG. 1 shows a schematic drawing of a multizone circulating reactor having a first polymerization zone (1), a second polymerization zone (2) having a bed of densified polymer particles (3), lines for providing a barrier stream (4a'), and lines for providing feedstock (4b').
Figure 2:
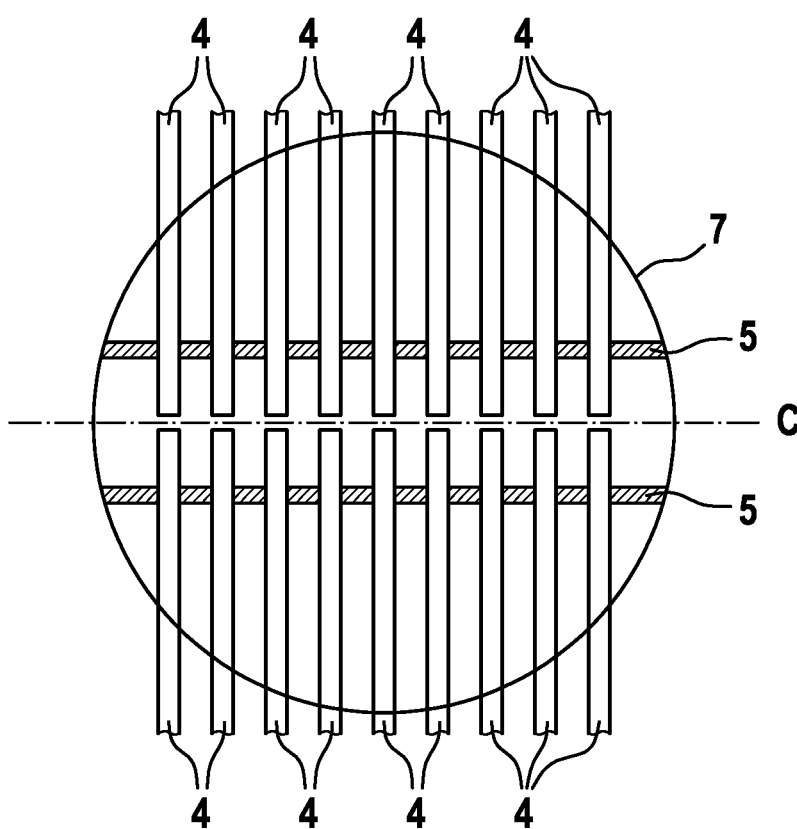
FIG. 2 shows a schematic top view of a second polymerization zone (2) having bars (4), supports (5), and a reactor wall (7), with "c" indicating a centerline of the second polymerization zone (2).
Figure 3A:
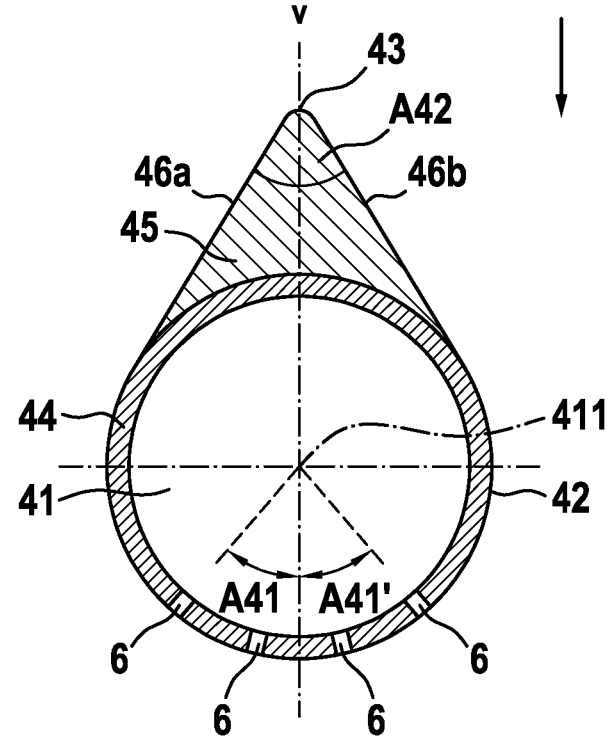
FIG. 3a shows a schematic cross section of a bar (4) with "v" depicting a vertical plane symmetrically dissecting a deviating part (43) and a distributing part (44) of a bar (4) and an arrow indicating the direction of flow of polymer particles.
Figure 3B:
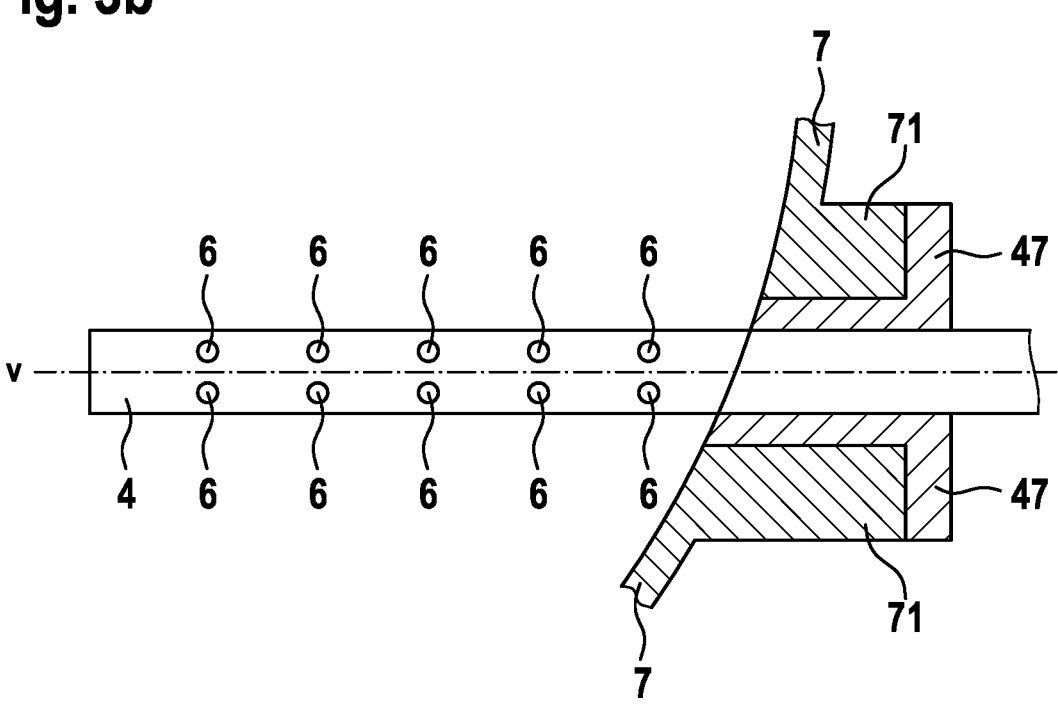
FIG. 3b shows a schematic bottom view of a bar (4) having a multiplicity of openings (6) arranged at the bottom of the bar (4); with the bar (4) being connected by a flange element (47) to a reactor wall (7) at a position where the reactor wall (7) is equipped with a nozzle (71) and "v" depicting a vertical plane symmetrically dissecting the bar (4).
Figure 4:
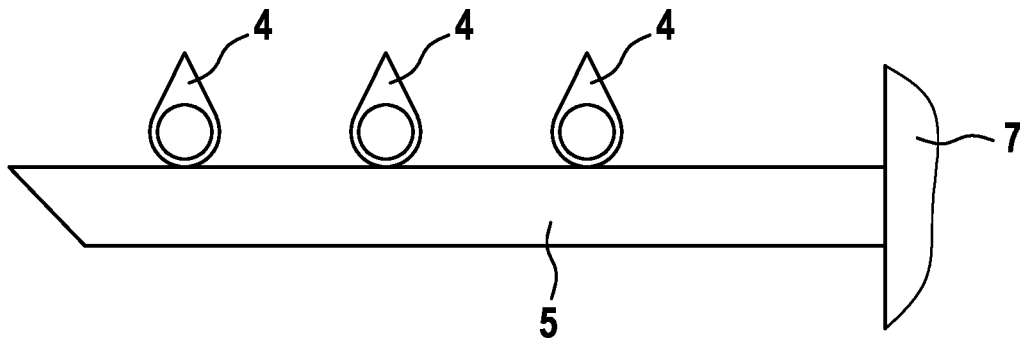
FIG. 4 shows a schematic side view of a support (5) for supporting bars (4).
Figure 5:
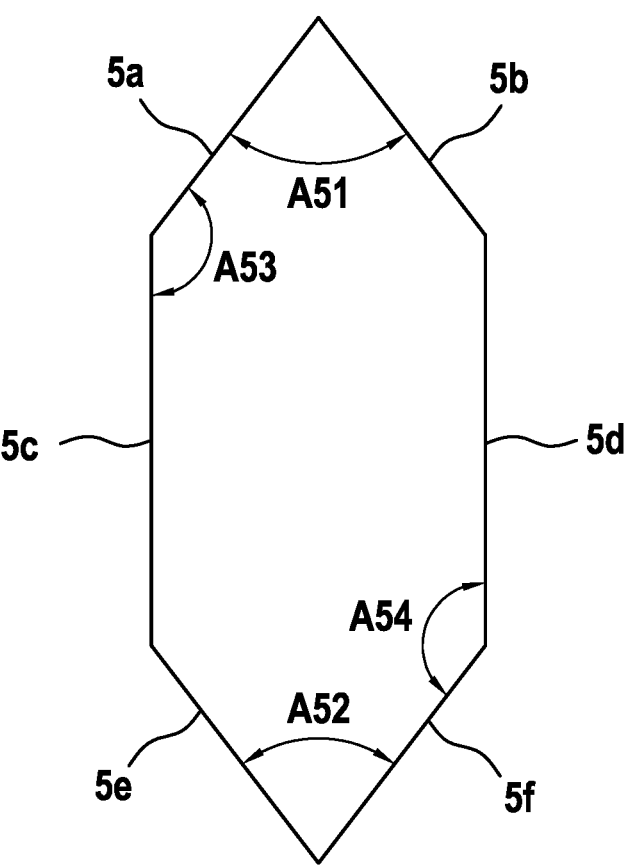
FIG. 5 shows a schematic cross section of a support (5) with angles A51, A52, A53, and A54.

In some embodiments, the present disclosure provides a reactor for carrying out a gas-phase olefin polymerization in the presence of a polymerization catalyst, including (i) a first polymerization zone (1) adapted and arranged for growing polymer particles to flow upward under fast fluidization or transport conditions, (ii) a second polymerization zone (2) adapted and arranged for the growing polymer particles to flow downward, and (iii) a set of bars (4) for introducing feedstock or a barrier stream into the second polymerization zone (2), wherein each bar (4) has (a) a hollow space (41) along the length of the bar (4) for conveying the feedstock or barrier stream within the bar, (b) a particle deviating top for preventing accumulation of the polymer particles on the bars (4), and (c) a multiplicity of openings (6) for distributing the feedstock or the barrier stream, wherein the openings (6) being arranged along the bottom half of the periphery (42) of the bar (4).

In some embodiments, the reactor further includes a gas/solid separation zone (8) for separating polymer particles from reaction gas, a connecting part (9) for connecting the top of the first polymerization zone (1) to the gas/solid separation zone (8), and a connecting part (10) for connecting the bottom of the second polymerization zone (2) to the bottom of the first polymerization zone (1). In some embodiments, the reactor further includes a gas recycle line (11) connecting the separation zone (8) to one or more points of reintroduction into the connecting part (10) or into the first polymerization zone (1), a line (14) for feeding a catalyst into the first polymerization zone (1), a line (15) for feeding monomers into the reactor, and a discharge system (16) for discharging polymer from the second polymerization zone (2). In some embodiments, the gas recycle line (11) is equipped with a heat exchanger (12) and a compressor (13).

In some embodiments, the first polymerization zone (1) and the second polymerization zone (2) of the apparatus of the are connected in different ways. In some embodiments, more than two polymerization zones are employed. In some embodiments, the structures and combinations are as described in Patent Cooperation Treaty Publication Nos. WO 00/02929 A1 and WO 97/04015 A1.

In some embodiments, the olefins polymerized in the reactor are 1-olefins, that is, hydrocarbons having terminal double bonds, without being restricted thereto. In some embodiments, the olefins are non-polar olefinic compounds. In some embodiments, the olefins are selected from the group consisting of linear $C_2$-$C_{12}$-1-alkenes, branched $C_2$-$C_{12}$-1-alkenes, conjugated dienes, nonconjugated dienes, and mixtures of various 1-olefins. In some embodiments, the olefins are linear $C_2$-$C_{10}$-1-alkenes selected from the group consisting of ethylene, propylene, 1-butene, 1-pentene, 1-hexene, 1-heptene, 1-octene, and 1-decene. In some embodiments, the olefins are branched $C_2$-$C_{10}$-1-alkenes, alternatively 4-methyl-1-pentene. In some embodiments, the olefins are conjugated and nonconjugated dienes selected from the group consisting of 1,3-butadiene, 1,4-hexadiene, and 1,7-octadiene. In some embodiments, the olefins have the double bond as part of a cyclic structure. In some embodiments, the cyclic structures have one or more ring systems. In some embodiments, the olefins are selected from the group consisting of cyclopentene, norbornene, tetracyclododecene, and methylnorbornene. In some embodiments, the olefins are dienes selected from the group consisting of 5-ethylidene-2-norbornene, norbornadiene, and ethylnorbornadiene. In some embodiments, the reactor is used to polymerize mixtures of two or more olefins.

In some embodiments, the reactor is used for the homopolymerization or copolymerization of ethylene or propylene. In some embodiments, the reactor is used for the homopolymerization or copolymerization of ethylene. In some embodiments, the comonomers in propylene polymerization are up to 40 wt.-% of ethylene, 1-butene, or 1-hexene, alternatively from 0.5 to 35 wt.-% of ethylene, 1-butene, or 1-hexene. In some embodiments, the comonomers in ethylene polymerization are up to 20 wt.-%, alternatively 0.01 to 15 wt.-%, alternatively from 0.05 to 12 wt.-%, of $C_3$-$C_8$-1-alkenes. In some embodiments, the $C_3$-$C_8$-1-alkenes are selected from the group consisting of 1-butene, 1-pentene, 1-hexene, and 1-octene. In some embodiments, ethylene is copolymerized with from 0.1 to 12 wt.-% of 1-hexene or 1-butene.

In some embodiments, the design of the bars (4) used for introducing feedstock or a barrier stream into the second polymerization zone (2) permits an even distribution of the respective component while maintaining an uninterrupted flow of the polymer particles passing through the reactor. In some embodiments, the bars (4) are arranged at different elevations within the second polymerization zone (2). In some embodiments, the location of the bars (4) within the second polymerization zone (2) varies, depending on the function of the bars (4). In some embodiments, the bars (4) belonging to the same set of bars are arranged at the same elevation.

In some embodiments, the bars (4) have a hollow space (41) along the length of the bar (4) for conveying the feedstock or the barrier stream within the bar (4). Each bar (4) has a multiplicity of openings (6) for distributing the feedstock or the barrier stream. The openings (6) are arranged along the bottom half of the periphery (42) of the bar (4), thereby allowing the feedstock or the barrier stream conveyed within the bar (4) to exit the hollow space (41)

within the bar (4) and distribute into the second polymerization zone (2). In some embodiments, each bar (4) has a distributing part (44) for distributing the feedstock or the barrier stream. In some embodiments, the distributing part (44) is in the shape of a pipe. The arrangement of the openings (6) along the bottom half of the periphery (42) of the bar (4) provides an equal distribution of the feedstock or the barrier stream over the whole width of the second polymerization zone (2). In some embodiments, the pipe has a diameter of 25 to 100 mm.

In some embodiments, even distribution is achieved by arranging the openings (6) in a particular pattern. In some embodiments, the hollow space (41) in the bar (4) has a center axis (411), which runs along the length of the bar (4), and the openings (6) are arranged within the part of the bottom half of the periphery (42) of the bar (4), such that an angle (A41, A41') between a vertical plane (v) through the center axis (411) and a plane passing through an opening (6) and the center axis (411) is from 0° to 70°, alternatively from 20° to 50°.

In some embodiments, the openings (6) in the distributing part (44) have a diameter of 0.5 mm to 10 mm, alternatively 1.5 mm to 5 mm. It is believed that this selection of the size of the openings (6) prevents clogging of the openings and accumulating the distributed component.

In some embodiments, the bars (4) have a particle deviating top to prevent accumulation of polymer particles on the bars (4). In some embodiments, the particle deviating top of the bar (4) includes a top edge (43) which extends along the length of the bar (4). In some embodiments, the particle deviating top of the bar (4) has a first planar surface (46a) and a second planar surface (46b), wherein the intersection of the first planar surface (46a) and the second planar surface (46b) forms the top edge (43), thereby form dihedral angle (A42) between the surfaces (46a, 46b) is less than 120°, alternatively from 10° to 100°, alternatively from 30° to 80°. In some embodiments, the particle deviating top of the bar (4) is formed by a deviating part (45) which is arranged on top of distributing part (44).

In some embodiments, the bars (4) have a particle deviating top and a particle deviating shape on the bottom half of the periphery (42) of the bar (4). In some embodiments, the bottom half of the periphery (42) of the bars (4) includes a bottom edge for ensuring free flow of the polymer particles. In some embodiments, the bottom half of the periphery (42) of the bar (4) has a semicylindrical shape.

In some embodiments, the whole width of the second polymerization (2) is covered by bars (4), thereby ensuring even distribution. In some embodiments, the bars (4) are attached to a first side of the second polymerization zone (2) and extend into the second polymerization zone (2) towards the side opposite the first side.

In some embodiments, the bars (4) bridge the width of the second polymerization zone (2) and extend across the second polymerization zone (2) to the opposite side. In some embodiments, the bars (4) then form a gap between the end of each bar (4) and the opposite reactor wall. In some embodiments, the gap is no more than 200 mm, alternatively 10 to 200 mm, alternatively 20 to 100 mm, alternatively 30 to 80 mm. It is believed that this gap between the end of the bar (4) and the reactor wall (7) further stabilizes the flow of the polymer particles.

In some embodiments and for large reactors, the mechanical stability and robustness of the bars (4) contribute to a long lifetime of the bars (4) and the reactor and a smooth production cycle. In some embodiments, the mechanical stability of the bars (4) was improved with an arrangement of shorter bars instead of a single bar spanning the width of the second polymerization zone (2). In some embodiments, the bars (4) of a set of bars are arranged to extend partially across the width of the second polymerization zone (2) from a first side of the second polymerization zone (2) and partially across the width of the second polymerization zone (2) from the side opposite the first side, thereby leaving a gap between the opposing bars (4). In some embodiments, the opposing bars (4) are arranged at the same elevation within the second polymerization zone (2). In some embodiments, the length of a first bar (4) on the first side of the second polymerization zone (2) corresponds to the length of the second bar (4) extending from the side opposite the first side of the second polymerization zone (2). In some embodiments, the gap between the opposing bars (4) is located along a centerline (c) of the second polymerization zone (2). As described herein, the centerline (c) of the second polymerization zone (2) is a straight line passing through the center of the second polymerization zone (2) at the second polymerization zone's largest expansion. In some embodiments, the gap between the opposing bars (4) is no more than 200 mm, alternatively 10 to 200 mm, alternatively 20 to 100 mm, alternatively 30 to 80 mm.

In some embodiments, more than one set of bars (4) are present, and the sets are arranged on top of each another. In some embodiments, the sets are arranged in a staggered manner. As used herein, "staggered manner" refers to the bars (4) of a first set being located in between the free spaces created by the bars (4) of a second set below or above the first set of bars (4). In some embodiments, the bars (4) of each set are equally interspaced and arranged to be parallel to each other.

In some embodiments, the bars (4) are used for introducing a barrier stream, for example, provided by a line (4a'), into the second polymerization zone (2) for preventing the gas mixture present in the first polymerization zone (1) from entering the second polymerization zone (2). In some embodiments, these barrier stream bars are arranged at the top part of the second polymerization zone (2), the number of sets of bars (4) for introducing a barrier stream is at least one, alternatively 2 to 5, alternatively 2 to 3, and the barrier stream bars of each set is arranged at the same elevation. In some embodiments, each set of barrier stream bars includes 2 to 20, alternatively 4 to 12, barrier stream bars. In some embodiments, the different sets of bars (4) for introducing a barrier stream are arranged at different elevations within the top part of the second polymerization zone (2). In some embodiments, the distance between each set is 100 to 3000 mm, alternatively 300 to 1000 mm. In some embodiments, the barrier stream is a gas barrier stream, a liquid barrier stream, or a gas/liquid barrier stream.

In some embodiments, the second polymerization zone (2) has a bed of densified polymer particles (3). In some embodiments, the bars (4) for introducing a barrier stream are arranged below the surface of the bed of densified polymer particles (3). In some embodiments, the barrier stream bars are submerged within the bed of densified polymer particles (3). In some embodiments, the distance between the topmost set of barrier stream bars and the surface of the bed of densified polymer particles (3) is more than 100 mm, alternatively more than 500 mm.

In some embodiments, the bars (4) are used for introducing feedstock, for example, provided by a line (4b'), into the second polymerization zone (2). In some embodiments, the feedstock bars are arranged at different elevations within the second polymerization zone (2). In some embodiments, the feedstock bars are arranged below the lowest set of barrier stream bars (4*a*). In some embodiments, the number of sets of bars (4) for introducing the feedstock into the second polymerization zone (2) is 1 to 20, alternatively 3 to 10. In some embodiments, each set of feedstock bars has 1 to 10, alternatively 2 to 7, bars (4). In some embodiments, the feedstock is made from or containing the monomer to be polymerized and optionally one or more further components. In some embodiments, the monomer and the further components are present in a ratio of 5:95 to 100:0. In some embodiments, the further components are selected from the group consisting of inert components, comonomer, and hydrogen.

In some embodiments, the reactor has at least 1, alternatively 2 to 5, alternatively 2 to 3, sets of bars (4) for introducing a barrier stream and 1 to 20, alternatively 3 to 10, sets of bars (4) for introducing feedstock.

In some embodiments and to ensure mechanical stability of the bars, the reactor has a set of supports (5) for supporting the bars (4). In some embodiments, the supports are in direct contact with the bars (4). In some embodiments, the supports (5) are arranged underneath the bars (4). In some embodiments, the supports (5) are arranged perpendicular to the bars (4). In some embodiments, the supports (5) are for supporting the bars (4) for introducing a barrier stream.

In some embodiments, the length of the supports (5) is selected according to the size of the reactor. In some embodiments, the supports (5) extend across the whole width of the second polymerization zone (2). In some embodiments, the supports (5) extend partially across the width of the second polymerization zone (2) from a first side and partially across the width of the second polymerization zone (2) from the side opposite the first side, wherein the opposing supports (5) are on the same elevation, thereby creating a gap between the opposing supports (5). In some embodiments, the gap between the opposing supports (5) is no bigger than 600 mm, alternatively no bigger than 500 mm.

In some embodiments, the supports (5) are attached to the wall (7) of the reactor and extend horizontally therefrom. In some embodiments, the supports (5) are designed to limit the weight of the supports (5) and ensure mechanical stability to sustain the bars (4). In some embodiments, the cross section area of the supports (5) decreases along at least part of the supports' longitudinal direction. In some embodiments, the end of the supports (5) having the smallest cross section is farthest from the connection site on the wall (7) of the reactor.

In some embodiments, the supports (5) are used for supporting the bars (4) for introducing a barrier stream and the ratio of barrier stream bars to supports (5) is 2:1 to 10:1, alternatively 2:1 to 4:1. It is believed that the ratio of barrier stream bars to supports (5) provides mechanical stability and allows undisturbed flow of the polymer particles in the second polymerization zone (2).

In some embodiments, the shape of the supports (5) is adapted to prevent accumulation and ensure free flow of the polymer particles. In some embodiments, the supports (5) are diamond shaped. In some embodiments, the supports (5) are in the form of a hexagonal prism extending horizontally from the wall (7) of the reactor. In some embodiments, the supports (5) are shaped to have two side faces (5*c*, 5*d*), two top faces (5*a*, 5*b*) spanning an angle A51 of less than 90°, and two bottom faces (5*e*, 5*f*) spanning an angle A52 of less than 90°. In some embodiments, the two side faces (5*c*, 5*d*) are arranged parallel to each other. To ensure slip-off of the polymer particles, an angle A53 between the top faces (5*a*, 5*b*) and the side faces (5*c*, 5*d*) or an angle A54 between the bottom faces (5*e*, 5*f*) and the side faces (5*c*, 5*d*) is greater than 90°. In some embodiments, the side faces (5*c*, 5*d*) are arranged to be aligned with the direction of the flow of the polymer particles. In some embodiments, the design of the supports (5) ensures undisturbed flow of the polymer particles and prevents the formation of dead spaces within the polymerization zone.

In some embodiments, the geometrical shape of the supports is optimized. In some embodiments, the length of the first top face (5*a*) is equal to the length of the second top face (5*b*). In some embodiments, the length of the first side face (5*c*) is equal to the length of the second side face (5*d*). In some embodiments, the length of the first bottom face (5*e*) is equal to the length of the second bottom face (5*f*).

In some embodiments, the different angles of the supports (5) are adapted to prevent accumulation of the polymer particles. In some embodiments, the angles A51 and A52 are the same. In some embodiments, the angles A51 and A52 are different. In some embodiments and for optimal slip-off, the angle A51 is bigger than the angle A52. In some embodiments, angle A51 is 10° to 80°, alternatively 50° to 70°. In some embodiments, angle A52 is 10° to 50°, alternatively 20° to 40°.

In some embodiments, the bars (4) and the supports (5) extend from the wall (7) of the reactor. In some embodiments, a first end of each bar (4) or support (5) is adapted to be form-fittingly connected to the wall (7) of the reactor, thereby minimizing disturbance in the polymer flow. In some embodiments, the end of the bar (4) or the support (5) connected to the wall is shaped such that continuity of the inner surface of the reactor is provided and a part of the bar (4) or the support (5) extending from the inner surface of the reactor within the interior of the reactor has the shape of the bar (4) or the support (5). In some embodiments, connection of the bars (4) or supports (5) is realized by introducing each bar (4) or support (5) through a nozzle (71), which is integrated in the reactor wall (7), into the reactor and form-fittingly securing the bars (4) or supports (5) in the nozzle (71) by an adapter. In some embodiments, the adapter is in the form of a flange element (47).

In some embodiments, the bars (4) or supports (5) are made from metal. In some embodiments, the metal is selected from the group consisting of low temperature steel and stainless steel. In some embodiments and to minimize disturbance of the polymer flow and the gas flow in the second polymerization zone (2), the bars (4) or supports (5) have a surface roughness Ra of no more than 5 μm, alternatively 0.1 μm to 5 μm, alternatively 0.5 μm to 4 μm, determined according to DIN ISO 25178.

In some embodiments, the reactor is part of a larger assembly, alternatively part of a series of reactors. In some embodiments, the reactor is further connected to an additional reactor, alternatively to a fluidized bed reactor (FBR). In some embodiments, combinations of such series include a fluidized-bed reactor followed by a reactor according to the present disclosure or a reactor according to the present disclosure followed by a fluidized-bed reactor. In some embodiments, the reactor according to the present disclosure is integrated into a series of reactors designed for the polymerization of ethylene or a series of reactors designed for the polymerization of propylene.

In some embodiments, the present disclosure provides a bar for introducing feedstock or a barrier stream into a polymerization reactor, having (a) a hollow space along the length of the bar for conveying the feedstock or the barrier stream within the bar, (b) a particle deviating top for preventing accumulation of the polymer particles on the bar, and (c) a multiplicity of openings for distributing the feedstock or the barrier stream, wherein the openings being arranged along the bottom half of the periphery of the bar. In some embodiments, the polymerization reactor is a multizone circulating reactor (MZCR). In some embodiments, the bar has a distributing part. In some embodiments, the distributing part is in the shape of a pipe with openings for distributing the feedstock or the barrier stream. In some embodiments, the openings are arranged along the bottom half of the periphery of the bar, thereby providing equal distribution over the whole width of the reactor. In some embodiments, the openings are arranged within an area defined by an angle with respect to a vertical plane symmetrically dissecting the distributing part. In some embodiments, the angle is 0° to 70°, alternatively 20° to 50°, with respect to a vertical plane symmetrically dissecting the distributing part.

In some embodiments, the openings have a diameter of 0.5 mm to 10 mm, alternatively 1.5 mm to 5 mm. In some embodiments, the deviating part is arranged at the top of the bars, thereby preventing accumulation of particles on top of the bars. In some embodiments, the deviating part has a first planar surface and a second planar surface, wherein the surfaces span an angle of less than 120°, alternatively an angle of 10° to 100°, alternatively an angle of 30° to 80°.

In some embodiments, the present disclosure provides a process for carrying out a gas-phase olefin polymerization at temperatures from 20° C. to 200° C. and pressures from 0.5 MPa to 10 MPa in the presence of a polymerization catalyst in the reactor, including the steps of (i) feeding one or more olefins into the reactor, (ii) contacting the olefins and the catalyst under reaction conditions in the first polymerization zone (1) and the second polymerization zone (2), and (iii) collecting the polymer product from the second polymerization zone (2), wherein (A) the growing polymer particles flow upward through the first polymerization zone (1) under fast fluidization or transport conditions, leave the first polymerization zone (1), enter the second polymerization zone (2), flow downward under the action of gravity through the second polymerization zone (2), leave the second polymerization zone (2), and are at least partially reintroduced into the first polymerization zone (1), thereby circulating the growing polymer particles between the first polymerization zone (1) and the second polymerization zone (2) and (B) the second polymerization zone (2) has a bed of densified polymer particles. In some embodiments, the process has feedstock or a barrier stream introduced into the second polymerization zone (2) through a set of bars (4).

In some embodiments, the polymerization is a homopolymerization of ethylene, a copolymerization of ethylene with one or more other olefins selected from the group consisting of 1-butene, 1-hexene, and 1-octene, a homopolymerization of propylene, or a copolymerization of propylene with one or more olefins selected from the group of ethylene, 1-butene, 1-hexene, and 1-octene.

In some embodiments, the process is a process for preparing an olefin polymer including the step of homopolymerizing an olefin or copolymerizing an olefin with one or more other olefins at temperatures from 20° C. to 200° C. and pressures from 0.5 MPa to 10 MPa in the presence of a polymerization catalyst, wherein the polymerization is carried out in the reactor.

In some embodiments, the reactor is operated at pressures from 0.5 MPa to 10 MPa, alternatively from 1.0 MPa to 8 MPa, alternatively from 1.5 MPa to 4 MPa. As used herein, the term "pressure" refers to absolute pressure, that is, pressure having the dimension MPa (abs). In some embodiments, the polymerization is carried out at temperatures from 30° C. to 160° C., alternatively from 65° C. to 125° C.

In some embodiments, the pressure difference between the pressure of the reaction gas in the second polymerization zone (2) and the pressure of the feedstock or the barrier stream in the hollow space (41) is from 1 to 500 kPa, alternatively from 5 to 200 kPa, alternatively from 10 to 100 kPa.

In some embodiments, the velocity of the feedstock or the barrier stream passing through the openings (6) at the bottom of the bars (4) is from 1 to 50 m/s, alternatively from 5 to 40 m/s, alternatively from 10 to 20 m/s.

In some embodiments, the polymerization in the reactor is carried out in a condensing or super-condensing mode, wherein part of the circulating reaction gas mixture is cooled to below the dew point and returned to the first polymerization zone either separately as a liquid and a gas-phase or together as a two-phase mixture, thereby making use of the enthalpy of vaporization for cooling the reaction gas.

In some embodiments, the polymerization is carried out in the presence of an inert gas or an alkane having from 1 to 10 carbon atoms. In some embodiments, the inert gas is nitrogen. In some embodiments, the alkane is selected from the group consisting of methane, ethane, propane, n-butane, isobutane, n-pentane, isopentane, n-hexane, and mixtures thereof. In some embodiments, the inert gas is nitrogen or propane. In some embodiments, propane is used with other alkanes. In some embodiments, the polymerization is carried out in the presence of a $C_3$-$C_5$ alkane as polymerization diluent, alternatively in the presence of propane. In some embodiments, the polymerization is a homopolymerization or a copolymerization of ethylene, carried out in the presence of a $C_3$-$C_5$ alkane as polymerization diluent, alternatively in the presence of propane. In some embodiments, the reaction gas mixture has a content of inert components from 30 to 99 vol. %, alternatively from 40 to 95 vol. %, alternatively from 45 to 85 vol. %. In some embodiments, the main monomer is propylene and no or minor amounts of inert diluent are added.

In some embodiments, the reaction gas mixtures are made from or containing the olefins to be polymerized, that is, the main monomer and one or more optional comonomers. In some embodiments, the reaction gas mixture is further made from or containing additional components such as antistatic agents or molecular weight regulators like hydrogen. In some embodiments, the components of the reaction gas mixture are fed into the polymerization zones or into the gas recycle line in gaseous form or as liquid which then vaporizes within the polymerization zones or the recycle line.

In some embodiments, the polymerization is carried out using Ziegler- or Ziegler-Natta-catalysts, Phillips catalysts based on chromium oxide, or single-site catalysts. As used herein, the term "single-site catalysts" refers to catalysts based on chemically uniform transition metal coordination compounds. In some embodiments, mixtures of two or more of these catalysts are used for the polymerization of olefins. In some embodiments, the mixed catalysts are designated as hybrid catalysts.

In some embodiments, the catalysts are of the Ziegler or Ziegler-Natta type. In some embodiments, the catalysts are made from or containing a compound of titanium or vanadium, a compound of magnesium and optionally an electron donor compound or a particulate inorganic oxide as a support material.

In some embodiments, the catalysts of the Ziegler or Ziegler-Natta type are used in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, the cocatalysts are organometallic alkyls, organometallic alkoxides, or organometallic halides.

In some embodiments, the organometallic compounds are made from or containing lithium alkyls, magnesium or zinc alkyls, magnesium alkyl halides, aluminum alkyls, silicon alkyls, silicon alkoxides, or silicon alkyl halides. In some embodiments, the organometallic compounds are made from or containing aluminum alkyls or magnesium alkyls. In some embodiments, the organometallic compounds are made from or containing aluminum alkyls, alternatively trialkylaluminum compounds or compounds of this type, wherein an alkyl group is replaced by a halogen atom. In some embodiments, the halogen is chlorine or bromine. In some embodiments, the aluminum alkyls are selected from the group consisting of trimethylaluminum, triethylaluminum, tri-isobutylaluminum, tri-n-hexylaluminum, diethylaluminum chloride, and mixtures thereof.

In some embodiments, the polymerization occurs in a reactor which is a part of a series of polymerization reactors, wherein also one or more polymerizations in other gas-phase reactors of the series of polymerization reactors occur. In some embodiments, combinations of such polymerization reactors include a fluidized-bed reactor followed by a reactor according to the present disclosure or a reactor according to the present disclosure followed by a fluidized-bed reactor.

The invention claimed is:

1. A reactor for carrying out a gas-phase olefin polymerization in the presence of a polymerization catalyst comprising:

(i) a first polymerization zone adapted and arranged for growing polymer particles to flow upward under fast fluidization or transport conditions, (ii) a second polymerization zone adapted and arranged for the growing polymer particles to flow downward, and (iii) a set of bars for introducing feedstock or a barrier stream into the second polymerization zone,
wherein each bar comprises (a) a hollow space along the length of the bar for conveying the feedstock or barrier stream within the bar, (b) a particle deviating top for preventing accumulation of the polymer particles on the bars, wherein the particle deviating top of the bar includes a top edge which extends along the length of the bar, and (c) a multiplicity of openings for distributing the feedstock or the barrier stream,
wherein the openings being arranged along the bottom half of the periphery of the bar.

2. The reactor according to claim 1, wherein the bottom half of the periphery of the bar has a particle deviating shape including a bottom edge which extends along the length of the bar.

3. The reactor according to claim 1, wherein each bar further comprises (d) a distributing part for distributing the feedstock or the barrier stream and (e) a deviating part which forms the particle deviating top of the bars.

4. The reactor according to claim 3, wherein the distributing part is in the shape of a pipe having a diameter of 25 mm to 100 mm.

5. The reactor according to claim 1, wherein the hollow space of the bar has a center axis, which runs along the length of the bar, and the openings are arranged within the part of the bottom half of the periphery of the bar, thereby forming an angle between a vertical plane (v) through the center axis and a plane passing through an opening and the center axis of from 0° to 70°.

6. The reactor according to claim 1, wherein the openings have a diameter of 0.5 mm to 10 mm.

7. The reactor according to claim 1, wherein the particle deviating top of the bar comprises a first planar surface and a second planar surface, wherein the intersection of the first planar surface and the second planar surface forms the top edge, thereby form a dihedral angle between the surfaces of less than 120°.

8. The reactor according to claim 1, wherein the bars are arranged to extend across a first part of the width of the second polymerization zone from a first side and across a second part of the width of the second polymerization zone from the side opposite the first side, thereby leaving a gap between the opposing bars.

9. The reactor according to claim 1, further comprising a set of supports for supporting the bars.

10. The reactor according to claim 1, wherein an end of the bars is adapted to be form-fittingly connected to the wall of the second polymerization zone.

11. The reactor according to claim 1, wherein the bars have a surface roughness Ra of no more than 5 μm, determined according to DIN ISO 25178.

12. The reactor according to claim 8, wherein the gap between the opposing bars is located along a centerline of the second polymerization zone.

13. The reactor according to claim 8, wherein the gap between the opposing bars is between 10 to 200 mm.

14. The reactor according to claim 1, wherein more than one set of bars are provided and arranged on top of each other.

15. The reactor according to claim 14, wherein the distance between each set of bars is 100 to 3000 mm.

16. The reactor according to claim 1, wherein the bars are attached to a first side of the second polymerization zone and extend into the second polymerization zone towards the side opposite the first side.

17. A bar for introducing feedstock or a barrier stream into a multizone circulating reactor (MZCR), comprising:

(a) a hollow space along the length of the bar for conveying the feedstock or the barrier stream within the bar, (b) a particle deviating top for preventing accumulation of polymer particles on the bar, wherein the particle deviating top of the bar includes a top edge which extends along the length of the bar, and (c) a multiplicity of openings for distributing the feedstock or the barrier stream,
wherein the openings being arranged along the bottom half of the periphery of the bar.

18. A process for carrying out a gas-phase olefin polymerization at temperatures from 20° C. to 200° C. and pressures from 0.5 MPa to 10 MPa in the presence of a polymerization catalyst in the reactor according to claim 1, comprising the steps of (i) feeding one or more olefins into the reactor, (ii) contacting the olefins and the catalyst under reaction conditions in the first polymerization zone and the second polymerization zone, and (iii) collecting the polymer product from the second polymerization zone,

13

14 wherein (a) the growing polymer particles flow upward through the first polymerization zone under fast fluidization or transport conditions, leave the first polymerization zone, enter the second polymerization zone, flow downward under the action of gravity, leave the second polymerization zone, and are at least partially reintroduced into the first polymerization zone, thereby circulating the growing polymer particles between the first polymerization zone and the second polymerization zone, (b) the second polymerization zone comprises a bed of densified polymer particles, and (c) feedstock or a barrier stream is introduced into the second polymerization zone through the set of bars.

19. The process according to claim 18, wherein the pressure difference between the pressure of the reaction gas in the second polymerization zone and the pressure of the feedstock or the barrier stream in the hollow space is from 1 to 500 kPa.

\* \* \* \* \*